United States Patent [19]

Aughton

[11] 4,110,796
[45] Aug. 29, 1978

[54] HALF-TONE IMAGE RECORDING SYSTEM

[75] Inventor: John E. Aughton, London, England

[73] Assignee: Crosfield Electronics Limited, London, England

[21] Appl. No.: 773,193

[22] Filed: Mar. 1, 1977

[30] Foreign Application Priority Data

Mar. 3, 1976 [GB] United Kingdom ............... 8518/76

[51] Int. Cl.² ............................................. H04N 1/24
[52] U.S. Cl. .................................... 358/298; 358/302
[58] Field of Search ............... 358/298, 296, 300, 302, 358/75, 80; 346/108; 350/150, 157, 286

[56] References Cited

U.S. PATENT DOCUMENTS

| 3,725,574 | 4/1973 | Gast | 358/298 |
| 4,025,189 | 5/1977 | Pugsley | 355/38 |

Primary Examiner—Raymond F. Cardillo, Jr.
Attorney, Agent, or Firm—Kemon & Estabrook

[57] ABSTRACT

In an image-reproducing system in which a number of parallel light beams contribute to the formation of half-tone dot areas on a record medium and scan over the record medium together, a reversing prism is included in the beam path to permit the line fit or line overlap to be closely controlled. The prism also adjusts the spacing between beams in the scanning direction which is provided when a coherent light source is used to avoid interference between adjacent beams.

6 Claims, 3 Drawing Figures

HALF-TONE IMAGE RECORDING SYSTEM

This invention relates to image reproducing systems and especially to half-tone image reproducing systems of the kind in which a number of separate light beams are simultaneously scanned over an image-recording surface, the light beams falling on points such that some or all of them contribute to the formation of a single half-tone dot area. Beams contributing to a single half-tone dot area may be modulated with the same or with different image information for that area and are modulated with different half-tone information. If the lines recorded by different beams are to be adjacent one another, it is important to ensure that they are accurately positioned so as to avoid undesired overlapping or the creation of "empty" lines between the scanned lines. Alternatively, it may be desired for adjacent beams to overlap to provide a desired intensity pattern, as disclosed in U.S. Pat. No. 4,025,189 dated May 24, 1977 and in this case it is important that the predetermined degree of overlap is maintained in order to avoid undesired intensity variations.

A half-tone image recording system according to the present invention comprises: means for generating a number of separate beams of radiation which, in cross section, form a line of spaced beams; a support for a recording surface to be treated by exposure to the beams of radiation; means producing relative movement of the recording surface on the one hand and the beams on the other hand, whereby the recording surface is scanned by the beams; modulating means for individually modulating the beams incident at points on the recording surface as required by the density variations of the image to be reproduced and by the screen density variations required to produce a half-tone image, the modulation being such that some or all of the modulated beams contribute towards the recording of a single half-tone dot; and means for rotating the line of beams about an axis parallel to their direction of travel to alter the angle of the line of beams incident on the recording surface relative to the direction of beam scanning over the recording surface.

Preferably, the means for rotating the line of beams is a reversion prism (K prism). However, other forms of reversing prisms may be used, for example a Dove prism; such prisms are sometimes called half-speed prisms because as the prism is rotated around the optical axis, an image rotation of twice the amount of prism rotation is produced. An advantage of such prisms is that the axis along which the light emerges from the prism is a continuation of the axis along which it enters the prism.

Thus, the angle of inclination of the spots on the image recording surface is not dependent on the orientation of the original row of beams. Rotation of the prism provides a fine adjustment for ensuring that the line scanned by each spot is correctly positioned in relation to the lines scanned by adjacent spots. In other words, the extent to which the lines fit against one another, or overlap one another, may be controlled. These adjustments are obtained without the rotation of the whole of the optical system which would be necessary in the absence of the reversion prism.

Additionally, the spacing between beams in the direction of scanning is adjusted. By providing a spacing between the beams in the scanning direction it can be ensured that two adjacent beams do not fall on the same recording area at the same time. This is important when the beams are of coherent radiation and are derived from a common laser, since overlapping of the beams would then produce interference which would distort the tone values of the image. By suitably positioning the beams in relation to one another it can be ensured that the beam tracks fit against one another or overlap one another, as required, without allowing adjacent beams to fall on the same spot at the same time. When the beams are spaced in the direction of scanning in this way, the modulation signals controlling the later beams are delayed in accordance with the spacing between the beams at the recording surface.

In order that the invention may be better understood, one system embodying the invention will now be described, by way of example, with reference to the accompanying drawings, in which.

Figure 1:
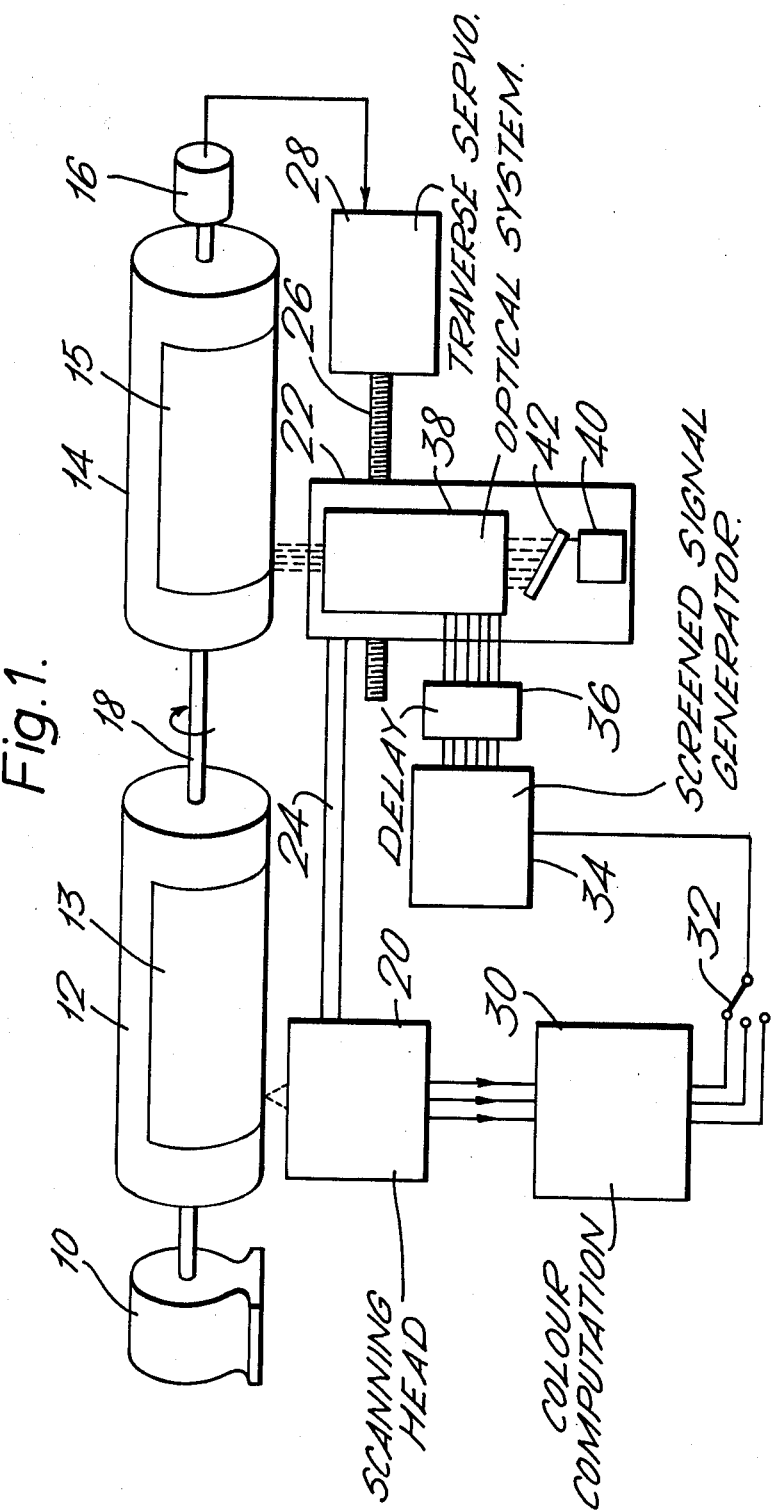
FIG. 1 shows image-reproducing means embodying the invention.

In the image-reproducing apparatus shown in FIG. 1, a motor 10 drives an input drum 12, an output drum 14 and a shaft transducer 16 mounted on a common shaft. The input drum 12 carries the image 13 to be reproduced and this image is scanned by an analysing head 20. The output drum 14 carries a film 15 to be exposed to form a monochrome colour separation for a selected colour component. The film 15 is scanned by the multiple-output exposing head 22. These two heads are mechanically coupled through a member 24 and move together along a lead screw 26 controlled by a traverse servo 28 in turn controlled by the signals from the shaft transducer 16.

The output of the scanning head 20 is in the form of three colour channel signals (red filter, blue filter and green filter) and these signals are fed to a colour computation unit 30 in which corrections are introduced in a manner known in itself, the value of the correcting signal for one channel depending at least partially upon the values of the signals in the other channels. At the output of the colour computation unit 30, one of the three corrected colour signals is chosen by means of a colour-component selector switch 32 and is applied to a multiple-signal generator 34. This generates six signals which, in this example, are composed of the common signal from the colour computation unit 30 each in combination with a different screen-representing signal. The resulting screened and corrected colour signals are applied through a delay unit 36 to an optical system 38 in the exposing head 56. The optical system 38, which will be described in greater detail with reference to FIG. 2, includes individual modulators for six beams derived from a laser 40 by means of a beam splitter 42. The modulated beams are incident on the film 15 to be treated on the cylinder 14. Together, the six light beams contribute to the making of the half-tone exposure dots in the colour separation. They may contribute to two adjacent dots at any instant.

An image-reproducing system including a screened signal generator employing combinations of shift registers and signal generating units is described in U.S. Pat. No. 4,012,584. Such a screened signal generator may be used in the reproducing system described above.

Figure 2:
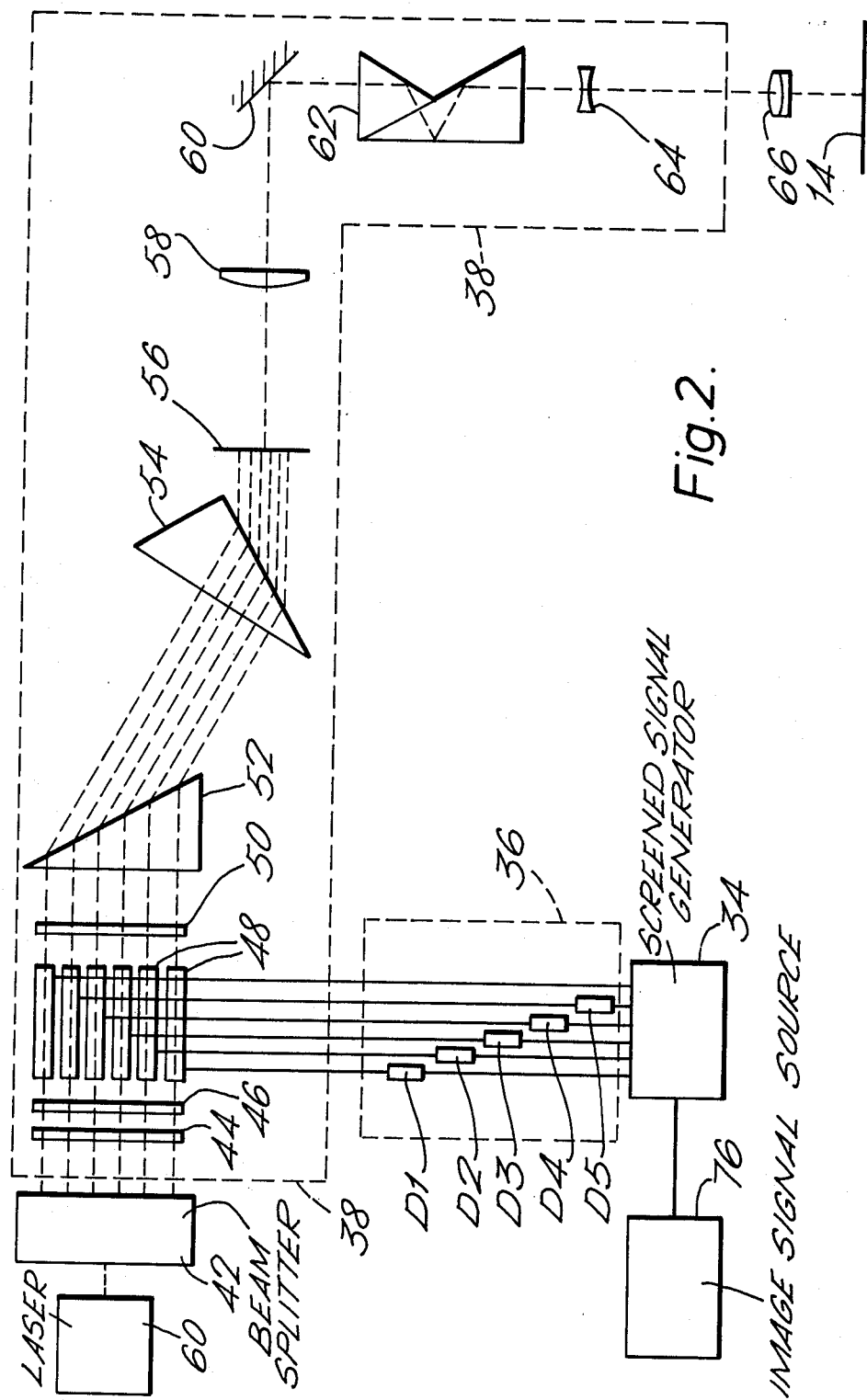
FIG. 2 illustrates the optical system of FIG. 1, including a reversion prism.

In FIG. 2, the laser 40, which may be a 10 mw Argon laser (Spectra-physics Model 162) operating at 488 nm, generates a coherent light beam which is applied to the beam splitter 42. In this example, the beam splitter 42 splits the original beam into six parallel beams which are applied through a half-wave plate 44 to a modulator system. The modulator system comprises an input polariser plate 46 and an output polariser plate 50 separated by electro-optic modulators 48, by means of which each of the light beams can be separately modulated. The modulated beams pass through prisms 52 and 54 which serve for anamorphic beam compression and the resulting closely spaced beams fall on a mask 56. The mask 56 contains six apertures defining the shape required for the beam cross-sections at the image-recording surface. Beams passing through the mask 56 (represented for simplicity by a single beam in the drawing) are collected by a field lens 58 and are reflected by a mirror 60 to a prism 62. The prism 62 is of the kind known as a "reversion prism". If the grooved surface of the prism is considered as its top, a beam incident on the prism is reversed in the top-to-bottom sense (180° rotation) but not in the lateral sense (0° rotation). A vector in an intermediate position is rotated by an intermediate amount.

Light leaving the reversion prism 62 passes through a negative lens 64 and a focusing lens 66 before falling on the film 15 on the surface of the cylinder 14.

In U.S. Pat. No. 4,025,189 dated May 24, 1977 there is described an image-reproducing system in which a record medium is exposed by a row of light modulators and in which the areas of illumination of the record medium by adjacent tones of the individual light modulators overlap. The optical apparatus shown in FIG. 2 is intended for use in such a system. For this reason, the apertures of the mask 56 are of the form shown in FIG. 3.

Figure 3:
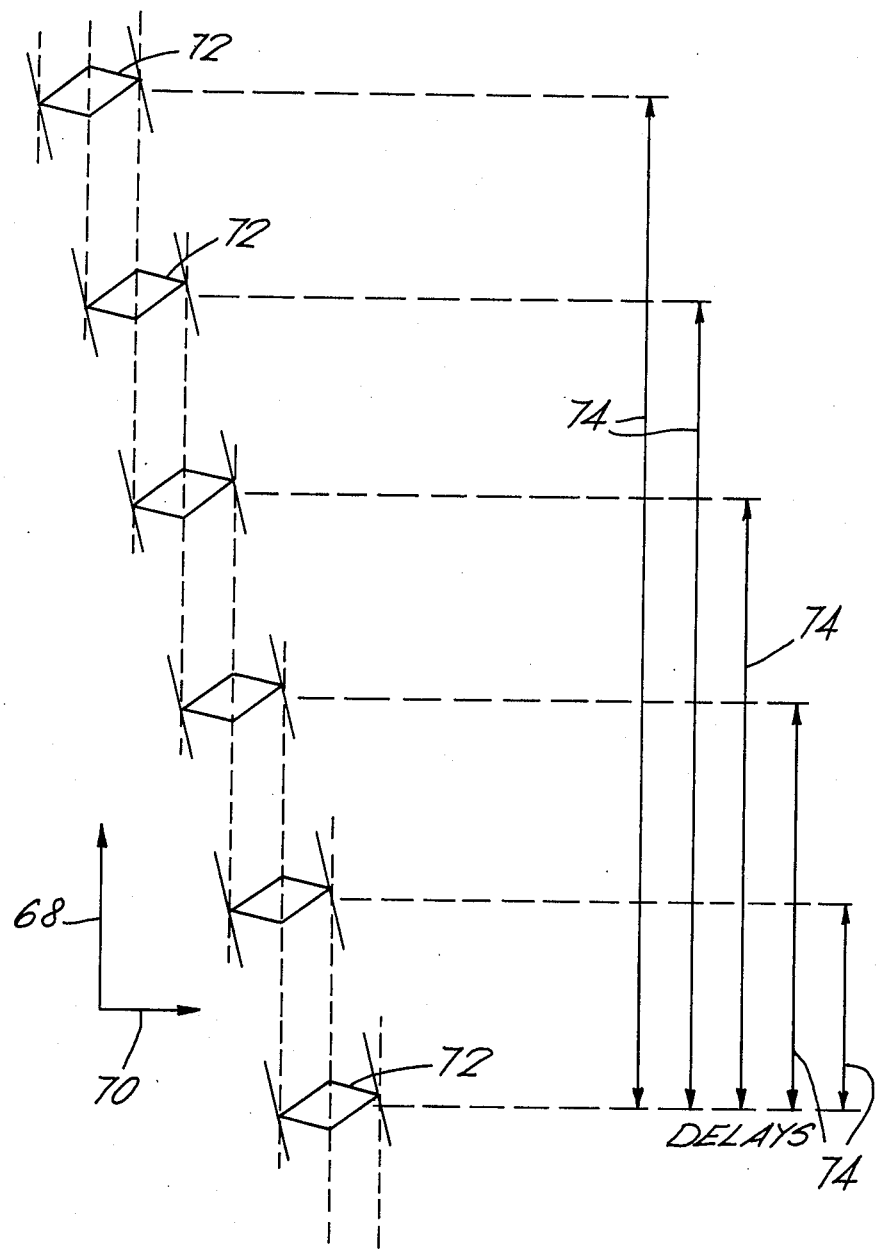
FIG. 3 illustrates the shape and arrangement of the apertures of the mask of FIG. 2.

FIG. 3 illustrates the pattern and shape of the apertures on the mask and also the pattern and shape of the beam spots as they fall on the film 15. The arrow 68 represents the direction of rotation of the cylinder and the arrow 70 represents the direction of slow traverse of the scanning head with respect to the cylinder. It will be seen that each aperture of the mask and consequently each spot 72 is shaped as a parallelogram and that a line through the centres of the parallelograms is oblique with respect to the direction of rotation of the cylinder. It will also be seen that one half of each parallelogram is in line, in the direction of rotation, with the other half of the next parallelogram. Thus each track in the direction of rotation is scanned by two adjacent spots 72, one after the other. In addition, the light passing through each of the parallelogram apertures will have a triangular intensity profile when integrated in the direction of rotation and their tracks overlap in the manner required by the above-mentioned specification disclosing overlapping areas of illumination.

The arrows 74 represent the delays which must be applied to the electrical signals controlling the modulation of the beams to compensate for the delay in the times at which different scanning beams cross the same half-tone dot area.

Returning now to FIG. 2, each of the modulators 18 has a pair of electrodes for each light channel. Five of the electrode pairs are connected through delay circuits D1 to D5 to the output of the screened signal generator 34, the other pair of electrodes being coupled directly to the circuit 34. The circuit 34 receives the image-representing signal from a source 76, corresponding to the units 12, 20, 30 and 32 of FIG. 1.

By rotating the prism 62 the angle of the line of scanning spots 72 (FIG. 3) with respect to the direction 68 of cylinder rotation can be adjusted without altering the axis of light travel. The prism 62 is conveniently constructed by cementing together a 30°-60°-90° prism and an equilateral prism. The input and output surfaces should be anti-reflection coated, for example with a single layer of $MgF_2$ optimised at the wavelength used. The base surface, at which the intermediate reflection occurs, should be silvered and protected and the "notch" surfaces should be polished.

The lens arrangement shown co-operates with the prism 62 to trim the spacing between scanning spots by adjusting magnification and thereby to trim the system to the delays applied to the modulating signals. In the system shown, the magnification setting using the lens arrangement affects "delay" mainly and affects the "line-fit" slightly; rotation of the prism 62 mainly affects "line-fit" and slightly affects "delay". The lens 66 images the mask at the required magnification (or, in practice, reduction) on the recording surface and lens 58 acts as a field lens and produces a "telecentric" condition. The lens 58 is separated from the mask by a distance which is about one tenth of its focal length, in which position it produces a magnification of about 1.1. By moving the lens a short distance, this magnification value can be varied slightly and hence provides a fine setting of delay.

Although the apertures are elongated in the traverse direction, in practice the resulting light will produce apparent elongation in the direction of rotation, owing to the finite rise time of the modulator amplifier drive signals, to give approximately equal resolution in the directions of rotation and traverse. It will be appreciated that the light profile also depends upon the distribution of illumination over the mask aperture but this effect can then be corrected if necessary by the mask shape.

The spacing of the beams in the direction of rotation prevents light from two adjacent spots falling on a single area of the surface to be treated at the same time and thereby avoids interference effects which would otherwise result from the overlapping of coherent light beams.

Beam compression also reduces the spacing of the illuminated areas in the direction of cylinder rotation and thereby reduces the required delays. A further advantage is that the reduction of the separation of the beam enables a smaller diameter lens 58 to be used, enabling a more compact system, particularly if the lens 58 is in a turret of alternative lenses. Such a turret permits easy change of screen ruling.

It is not essential to use delay circuits in the position shown in the drawing; instead, the relevant information may simply be read from a store at the appropriate time.

Suitable electro-optic modulators can be obtained from Electro-Optic Developments Ltd. of 117, High Street, Brentwood, Essex, England under the Type number PC 100/2 but other suitable Pockel and Kerr cell modulator devices are available.

The lens 64 between lenses 58 and 56 provides the following advantages. Firstly, lenses 58 and 64 act as a telephoto combination and make possible a shorter lens system. Secondly, by adjusting the lens 64 in conjunction with the lens 58, the magnification can be slightly changed while maintaining the telecentric condition. Thirdly, by inserting different pairs of lenses 58 and 64, the magnification can be changed considerably, for example to produce different half-tone screen rulings while maintaining the telecentric condition (together with the fine magnification adjustment); a common focus position for lens 66 is also maintained.

If desired, a feedback system can be introduced to help control the modulator; the light to control the feedback system can be derived at the mask 56, for example.

The beam splitter can be of any of the known kinds but is preferably of the kind disclosed in our copending Application No. 773,212, in the name of John E. Aughton, filed Mar. 1, 1977. Briefly, this comprises a single block of light transmitting material having a pair of parallel sides, one of which is coated to enhance its ability for internal reflection, except at the end at which the light beam enters; the other of the parallel sides is coated in the direction of its length with a succession of coatings so arranged that the parallel beams which emerge from the differently coated areas of the latter side after internal reflection from the first side are all of substantially equal intensity.

We claim:

1. A half-tone image recording system comprising: means for generating a number of separate beams of radiation which, in cross section, form a line of spaced beams; a support for a recording surface to be treated by exposure to the beams of radiation; means producing relative movement of the recording surface on the one hand and the beams on the other hand, whereby the recording surface is scanned by the beams; modulating means for individually modulating the beams incident at points on the recording surface in accordance with the image density to be reproduced and with the screen density variations required to produce a half tone image, the modulation being such that some or all of the modulated beams contribute towards a recording of a single half-tone image dot; and, positioned in the beam path, means for rotating the line of beams about an axis parallel to their direction of travel to alter the angle of the line of beams incident on the recording surface relative to the direction of beam scanning over the recording surface.

2. A half-tone image recording system comprising: a source of data representing the densities of points in the image to be recorded; means for generating a number of separate beams of coherent radiation which, in cross section, form a line of spaced beams; a support for a recording surface to be treated by exposure to the beams of radiation; means for producing relative movement of the recording surface on the one hand and the beams on the other hand whereby the recording surface is scanned by the beams; means for generating electric signals representing at any instant the densities of different points of a screen dot along a line perpendicular to the scanning direction; means for individually modulating the beams; modulation control means for the individual beam modulation, responsive to the screen-representing signals and to the image-representing signals such that at least some of the beams of a line of beams are modulated with a common image density derived from a single image point; means positioned in the beam path for rotating the line of beams about an axis parallel to their direction of travel to alter the angle at which the line of beams is incident on the recording surface, the beams at the recording surface being spaced in the direction of scanning as well as offset in a direction perpendicular thereto; and delaying means delaying the application of signals to the individual modulating means in accordance with the spacing of the corresponding beams in the scanning direction at the recording surface.

3. A system in accordance with claim 1 in which the means for rotating the line of beams is a K prism.

4. An image recording system in accordance with claim 2, comprising a mask which includes apertures through which the beams pass, the apertures having the shape required for the beam spot at the recording surface, the system further comprising a lens system for adjusting the magnification of the mask image at the recording surface.

5. A system in accordance with claim 4, wherein the lens system comprises a positive lens followed by a negative lens.

6. An image recording system in accordance with claim 4, in which the mask apertures and the location of their images at the recording surface are such that each part of the recording surface is in the track of two successive scanning spots corresponding to two apertures of the mask.

* * * * *